United States Patent

Scheifele et al.

Patent Number: 5,806,277
Date of Patent: Sep. 15, 1998

[54] APPARATUS FOR JOINING TWO STRIPS OF PACKAGING MATERIAL

[75] Inventors: Horst Scheifele, Stuttgart; Eberhard Krieger, Weinstadt, both of Germany

[73] Assignee: Robert Bosch GmbH, Stuttgart, Germany

[21] Appl. No.: 765,698

[22] PCT Filed: Apr. 25, 1996

[86] PCT No.: PCT/DE96/00724

§ 371 Date: Jan. 13, 1997

§ 102(e) Date: Jan. 13, 1997

[87] PCT Pub. No.: WO96/35615

PCT Pub. Date: Nov. 14, 1996

[30] Foreign Application Priority Data

May 13, 1995 [DE] Germany .................. 195 17 616.2

[51] Int. Cl.[6] ............................................. B65B 51/10
[52] U.S. Cl. .................... 53/374.4; 156/499; 156/555; 156/582; 156/583.1
[58] Field of Search .................. 156/499, 582, 156/555, 583.1; 53/477, 374.4

[56] References Cited

U.S. PATENT DOCUMENTS

| 2,577,249 | 12/1951 | Jenett | 53/477 |
|---|---|---|---|
| 3,938,931 | 2/1976 | Emmel | 156/499 |
| 4,310,365 | 1/1982 | Elliott et al. | 156/499 |
| 4,657,625 | 4/1987 | Kawakami | 156/582 |
| 4,709,537 | 12/1987 | Ballestrazzi et al. | 53/374.4 |
| 5,139,600 | 8/1992 | Singer | 156/499 |
| 5,156,714 | 10/1992 | Thomas | 156/499 |
| 5,680,747 | 10/1997 | Spatafora et al. | 53/374.4 |

FOREIGN PATENT DOCUMENTS

| 0554664 | 1/1993 | European Pat. Off. | 53/374.4 |

*Primary Examiner*—James F. Coan
*Assistant Examiner*—Gene L. Kim
*Attorney, Agent, or Firm*—Greigg & Greigg

[57] ABSTRACT

An apparatus for joining a bottom foil to a cover foil comprising a heating roller and a sealing roller that cooperates with the heating roller. In the inlet region of the heating roller, there is a preheater for the cover foil. To enable especially good handling of the cover foil, an additional preheater, embodied as a heating wedge, for the cover foil is disposed in the immediate vicinity of the heating roller. Instead of the preheater, the sealing roller may also be embodied as heatable.

21 Claims, 2 Drawing Sheets

1

APPARATUS FOR JOINING TWO STRIPS OF PACKAGING MATERIAL

PRIOR ART

The invention is based on an apparatus for joining two strips of packaging material and as disclosed for instance in European Patent Application EP 0 432 126 A1. Such an apparatus is used particularly for sealing a plastic strip, comprising thermoplastic material and provided with wells for tablets, lozenges or the like, to a cover foil. In the known apparatus, the two strips of foil to be sealed to one another are preheated by means of a heating blower, which acts on the inlet region between the heating and sealing rollers.

It has been found in practice that such preheaters sometimes function unsatisfactorily; that is, a tight seal is not assured. This is true particularly for cover foils that are hard to handle. Cover foils that are hard to handle include for instance cover foils that are especially readily recycled, or those that have particular functional properties. This pertains in particular to so-called peel-off cover foils, which on the one hand should enable a tight bond with the plastic strip but on the other enable a simple manual peeling off of the cover foil from the plastic strip.

ADVANTAGES OF THE INVENTION

The apparatus according to the invention for joining two strips of packaging material has the advantage over the prior art that even hard-to-handle cover foil materials can be handled safely and reliably, so that tight seals with the underlying plastic strip are always produced.

Further advantages and advantageous further features of the apparatus of the invention for joining two strips of packaging material will become apparent from the claims and the specification.

BRIEF DESCRIPTION OF THE DRAWING

Two exemplary embodiments of the invention are shown in the drawing and will be described in further detail in the ensuing description.

DESCRIPTION OF THE EXEMPLARY EMBODIMENTS

Figure 1:
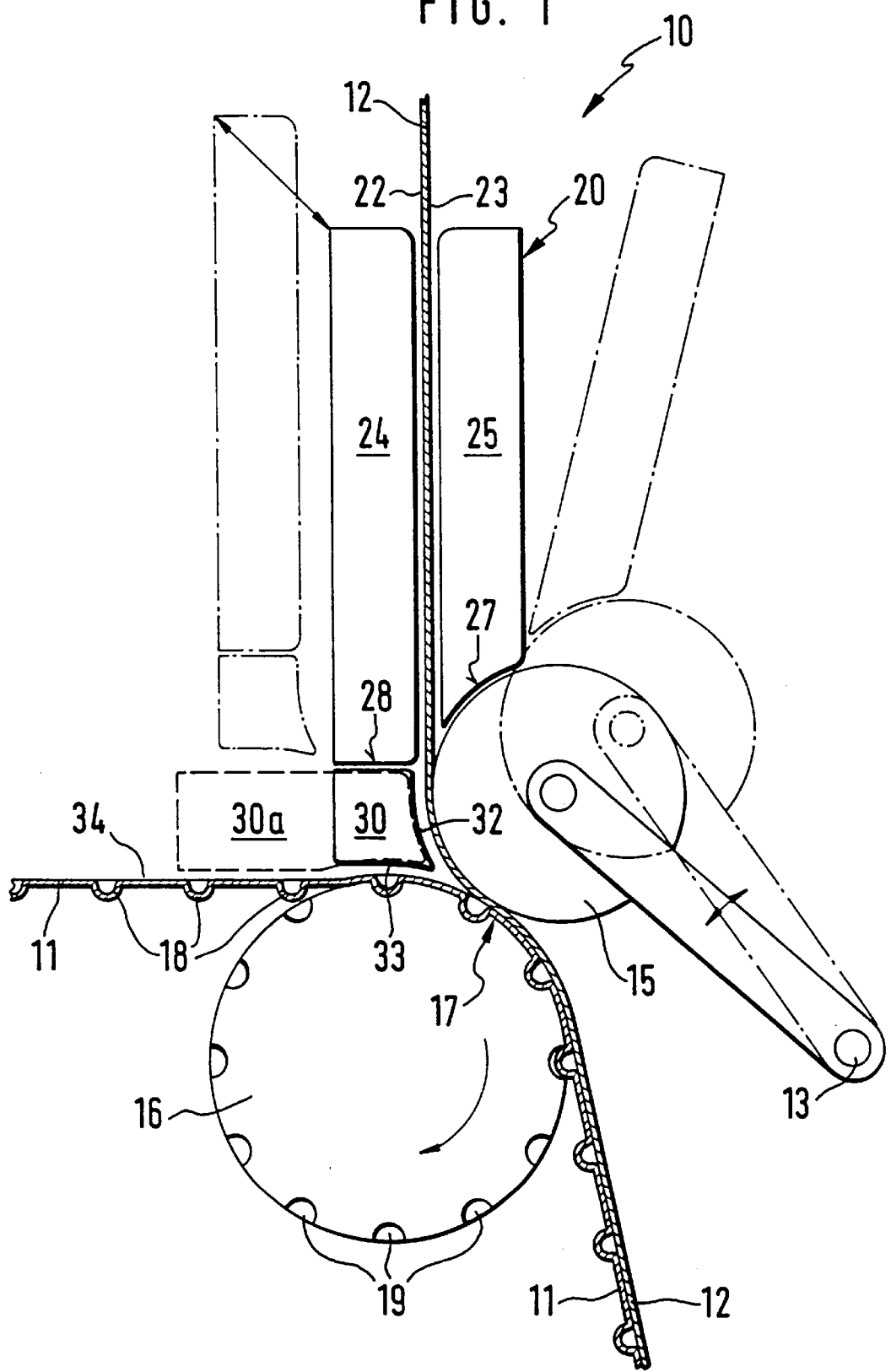
FIG. 1 shows an apparatus for joining two strips of packaging material in a simplified longitudinal section during two phases of operation, and FIG. 2, again in longitudinal section, shows a modified exemplary embodiment of FIG. 1.

An apparatus 10 for joining two strips of packaging material 11, 12 has a heating roller 15 that can pivot about a shaft 13 and a driven sealing roller 16 that cooperates with the heating roller 15. In the contact region 17 of the two rollers 15, 16, the two strips of packaging material, which can be called the bottom foil 11 and the cover foil 12, are joined or welded together in a manner known per se under the influence of heat and pressure.

In a preceding first station, not shown, wells 18 have been formed in the bottom foil 11, which is of thermoplastic material; the wells have then been filled at a second station, for instance with tablets. To transport the bottom foil 11, the sealing roller 16 has recesses 19 on its circumference that are adapted to the wells 18. The cover foil 12 is for instance of aluminum or a plastic material, such as polypropylene.

For heating the cover foil 12 to the requisite sealing temperature, not only the heating roller 15 is used but also a preheater 20 that cooperates with the heating roller 15. The preheater 20 has two heating plates 24, 25, spaced apart slightly and coinciding with the bottom and top sides 22 and 23, respectively, of the cover foil 12. The heating plate 25 acting on the top side 23 is advantageously joined to the heating roller 15 so that it can be pivoted out of the way about the shaft 13. The pivoted-away position of the heating roller 15 and heating plate 25 is shown in dashed lines in FIG. 1. To achieve the most uniform possible heating of the top side 23 of the cover foil 12, the end face 27 of the heating plate 25 toward the heating roller 15 is adapted form-fittingly to the heating roller 15, so that there is virtually no gap between the heating plate 25 and the heating roller 15. The heating plate 24 oriented toward the underside 22 of the cover foil 12 extends to approximately the level where the cover foil 12 rests on the heating roller 15. The end 28 of the heating plate 24 toward the sealing roller 16 is adjoined directly by a separately heatable heating edge 30, embodied as a preheater element, which extends toward the contact region 17 of the two rollers 15, 16.

The heating wedge 30, which has approximately the same thickness as the heating plate 24, is connected to the heating plate 24. During pauses in production, the heating plate 24 and heating wedge 30 are moved jointly away from the heating and sealing rollers 15 and 16, producing such a great distance from the bottom and cover foils 11 and 12 that these foils are no longer heated. Once again, the pivoted-away position of the heating plate 24 and heating wedge 30 is shown in dashed lines in FIG. 1.

The heating faces 32, 33 of the heating wedge 30 that are oriented toward the cover and bottom foils 12 and 11, respectively, are antiadhesively coated, and are each formed convexly to match the shape of the heating and sealing rollers 15 and 16, so that a constant spacing is established from the cover and bottom foils 12 and 11; this spacing is greater than the spacing between the heating plate 24 and the underside 22 of the cover foil 12.

In order to be able to achieve large-area preheating of the bottom foil 11 as well, in a modified form, the heating wedge 30a shown in dashed lines is lengthened parallel to the top side 34 of the bottom foil 11.

The above-described apparatus 10 for joining two strips of packaging material 11, 12 functions as follows:

The heating performance of the heating roller 15 and of the heating plates 24, 25 and heating wedge 30 and 30a can be regulated separately from one another. Typically, the heating edge 30 or 30a is regulated to the highest temperature, which may be near or even higher than the melting point of the cover foil 12. By means of the spacing of the heating wedge 30 or 30a from the cover foil 12, it is assured that the cover foil 12, however, cannot assume that temperature. Conversely, the two heating plates 24, 25 serving the purpose of preheating have the lowest temperature. To join the two strips of packaging material 11, 12, the sealing roller 16 is driven, preferably continuously; the advancement of the bottom foil 13 is effected by the form-fitting contact of the wells 18 inside the recesses 19 of the sealing roller 16. The cover foil 12, preheated by the two heating plates 24, 25 of the heating wedge 30 or 30a, is then, in the region 17, sealed with its underside 22 to the top side of the bottom foil 11 by the heating roller 15, by means of heat and pressure. The heating wedge 30 or 30a assures that the underside 22 of the cover foil 12 can be heated with an intensity that increases toward the heating roller 15, viewed in the feeding direction, so that particularly good sealing can be achieved. Especially because of the embodiment of the heating wedge 30a with its heating face 33a that is lengthened parallel to the top side 34 of the bottom foil 11, the bottom foil 11 is preheated as well, resulting in an optimal joining of the two strips of packaging material 11, 12, and the thermal strains between the bottom foil 11 and the cover foil 12 can be kept slight.

Figure 2:
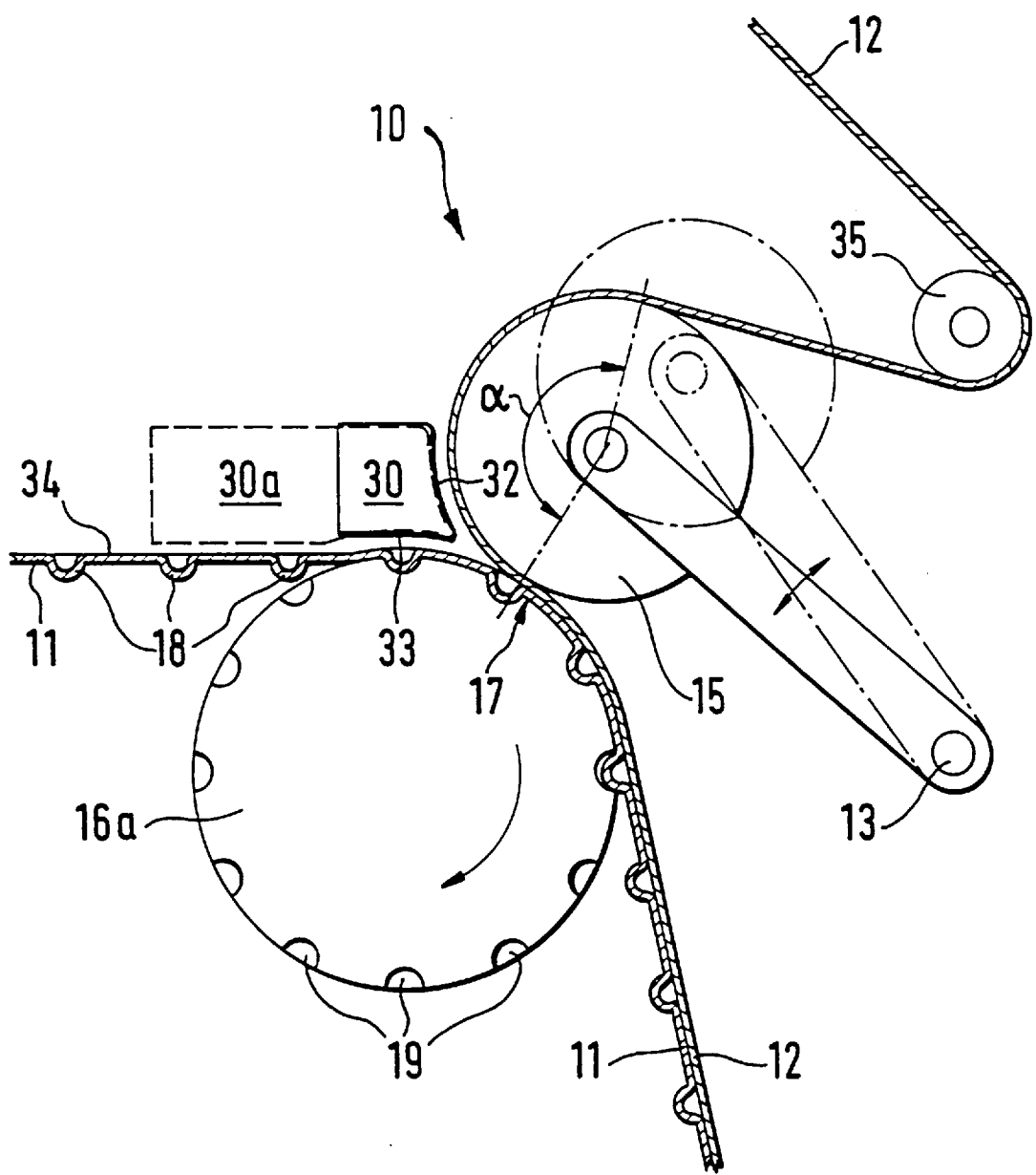

In the exemplary embodiment FIG. 2, the preheater 20 is omitted. Instead, not only the heating roller 15 but the sealing roller 16*a* as well are embodied as heatable. Thus, the temperature can be adapted to the material of the bottom foil 11 and to the product to be contained in the package, so that damage to the bottom foil 11 or the product is avoided. With the heated sealing roller 16*a*, it is possible to transmit additional thermal energy to the bottom foil 11, which contributes to better sealing. In addition, an additional deflection roller 35 is coupled to the heating roller 15. Via the position of the deflection roller 35 relative to the heating roller 15, the wrap angle α of the cover foil 12 and the heating roller 15 can be varied. The larger the wrap angle α, the lower the temperature of the heating roller 15, can be set for imparting a certain heat quantity to the cover foil 12, to be. On the other hand, at a predetermined temperature of the heating roller 15 and a correspondingly larger wrap angle α, especially large amounts of thermal energy can be transmitted to the strip of cover foil 12. In practice, the heating roller 15 has a predetermined temperature that is set to be constant. By a suitable choice of the wrap angle α it is then assured that the requisite heat energy is transmitted to the strip of cover foil 12.

It will be noted in addition that it is naturally also possible for the apparatus of the first exemplary embodiment also to be equipped with a heatable sealing roller 16. Then the advantages of the two exemplary embodiments can be combined. Moreover, it is possible, given a suitable material of the bottom foil 11, to dispense with an antiadhesive coating of the heating faces 33, 33*a* of the heating wedge 30 or 30*a*. Moreover, it should be noted that the use of the apparatus 10 is not limited to merely the blister strips described in the exemplary embodiment, but instead in principle can be adapted for two strips of packaging material to be joined together.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus (10) for sealing a first strip of packaging material (12) to a second strip of packaging material (11) under an influence of heat and pressure, comprising a heating roller (15) that heats the first strip of packaging material (12), a sealing roller (16) that cooperates with the heating roller (15), and a first preheater (30, 30*a*) that heats said second strip of packaging material, said first preheater (30, 30*a*) includes a concave end heating face (32) which is shaped to conform with a portion of the heating roller (15) and is closely spaced relative to the heating roller (15) with a same curvature for heating said first strip of packaging material (12), said first preheater (30, 30*a*) includes a bottom heating face (33) which is closely spaced relative to said sealing roller (16) and has a similar curvature for heating said second package strip (11), said first preheater (30, 30*a*) includes a wedge shaped end portion that extends into a gap between said heating roller (15) and said sealing roller (16), said wedge extending nearly as far as a contact region (17) of said heating roller (15) and said sealing roller (16) in order to act upon a contact region (17) between the two rollers (15, 16), a second preheater (20), associated with the first strip of packaging material (12) is provided, and that a temperature of the first preheater (30, 30*a*) and of the second preheater (20) can be regulated separately from one another.

2. The apparatus according to claim 1, in which the first preheater (30, 30*a*) is embodied as lengthened in a region of a top side (34) of the second strip of packaging material (11).

3. The apparatus according to claim 1, in which said face (32) of the first preheater (30, 30*a*) oriented toward an underside (22) of the first strip of packaging material (12) has a greater spacing from the underside (22) of the first strip of packaging material (12) than the facing of a corresponding face (24) of the second preheater (20) from the first strip of packaging material.

4. The apparatus according to claim 2, in which said face (32) of the first preheater (30, 30*a*) oriented toward an underside (22) of the first strip of packaging material (12) has a greater spacing from the underside (22) of the first strip of packaging material (12) than the facing of a corresponding face (24) of the second preheater (20) from the first strip of packaging material.

5. The apparatus according to claim 1, in which the first preheater (30, 30*a*), together with a portion (24) of the second preheater (20), is embodied for being pivoted away from the two strips of packaging material (11, 12).

6. The apparatus according to claim 2, in which the first preheater (30, 30*a*), together with a portion (24) of the second preheater (20), is embodied for being pivoted away from the two strips of packaging material (11, 12).

7. The apparatus according to claim 3, in which the first preheater (30, 30*a*), together with a portion (24) of the second preheater (20), is embodied for being pivoted away from the two strips of packaging material (11, 12).

8. The apparatus according to claim 4, in which the first preheater (30, 30*a*), together with a portion (24) of the second preheater (20), is embodied for being pivoted away from the two strips of packaging material (11, 12).

9. The apparatus according to claim 1, in which the sealing roller (16, 16*a*) is embodied as heatable.

10. The apparatus according to claim 2, in which the sealing roller (16, 16*a*) is embodied as heatable.

11. The apparatus according to claim 3, in which the sealing roller (16, 16*a*) is embodied as heatable.

12. The apparatus according to claim 5, in which the sealing roller (16, 16*a*) is embodied as heatable.

13. The apparatus according to claim 1, in which the first preheater (30, 30*a*), at least on said face (32) oriented toward the first strip of packaging material (12), has a temperature which is near or above a melting temperature of the first strip of packaging material (12).

14. The apparatus according to claim 2, in which the first preheater (30, 30*a*), at least on said face (32) oriented toward the first strip of packaging material (12), has a temperature which is near or above a melting temperature of the first strip of packaging material (12).

15. The apparatus according to claim 3, in which the first preheater (30, 30*a*), at least on said face (32) oriented toward the first strip of packaging material (12), has a temperature which is near or above a melting temperature of the first strip of packaging material (12).

16. The apparatus according to claim 5, in which the first preheater (30, 30*a*), at least on said face (32) oriented toward the first strip of packaging material (12), has a temperature which is near or above a melting temperature of the first strip of packaging material (12).

17. The apparatus according to claim 9, in which the first preheater (30, 30*a*), at least on said face (32) oriented toward the first strip of packaging material (12), has a temperature which is near or above a melting temperature of the first strip of packaging material (12).

18. The apparatus according to claim 1, in which the first strip of packaging material is a cover foil (12), and the second strip of packaging material is a bottom foil (11) provided with wells (19).

19. An apparatus (10) for sealing a first strip of packaging material (12) to a second strip of packaging material (11) under an influence of heat and pressure, comprising a heating roller (15) that heats the first strip of packaging material (12), a sealing roller (16a) that cooperates with the heating roller (15), and a first preheater (30, 30a) that heats said second strip of packaging material, said first preheater (30, 30a) includes a concave end heating face (32) which is shaped to conform with a portion of the heating roller (15) and is closely spaced relative to the heating roller (15) with a same curvature for heating said first strip of packaging material (12), said first preheater (30, 30a) includes a bottom heating face (33) which is closely spaced relative to said sealing roller (16) and has a similar curvature for heating said second package strip (11), said first preheater (30, 30a) includes a wedge shaped end portion that extends into a gap between said heating roller (15) and said sealing roller (16), said wedge extending nearly as far as a contact region (17) of said heating roller (15) and said sealing roller (16) in order to act upon a contact region (17) between the two rollers (15, 16a), the first strip of packaging material (12) is guided over a variable-position roller (35), and depending on a position of the roller (35) relative to the heating roller (15), a corresponding wrap angle α between the first strip of packaging material (12) and the heating roller (15) is established.

20. The apparatus according to claim 19, in which the sealing roller (16, 16a) is embodied as heatable.

21. The apparatus according to claim 19, in which the first preheater (30, 30a), at least on said face (32) oriented toward the first strip of packaging material (12), has a temperature which is near or above a melting temperature of the first strip of packaging material (12).

* * * * *